(12) United States Patent
Kim et al.

(10) Patent No.: US 11,937,033 B2
(45) Date of Patent: Mar. 19, 2024

(54) ELECTRONIC DEVICE INCLUDING SPEAKER

(71) Applicant: Samsung Electronics Co., Ltd., Gyeonggi-do (KR)

(72) Inventors: Sangjin Kim, Gyeonggi-do (KR); Sungyoung Lee, Gyeonggi-do (KR); Taehwa Moon, Gyeonggi-do (KR); Sunghyun Yoon, Gyeonggi-do (KR); Jeongmoo Ha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 17/431,873

(22) PCT Filed: Feb. 17, 2020

(86) PCT No.: PCT/KR2020/002232
§ 371 (c)(1),
(2) Date: Aug. 18, 2021

(87) PCT Pub. No.: WO2020/171505
PCT Pub. Date: Aug. 27, 2020

(65) Prior Publication Data
US 2022/0150610 A1    May 12, 2022

(30) Foreign Application Priority Data

Feb. 18, 2019  (KR) ........................ 10-2019-0018524

(51) Int. Cl.
*H04R 1/02* (2006.01)
*H05K 5/00* (2006.01)
*H04M 1/02* (2006.01)

(52) U.S. Cl.
CPC ............ *H04R 1/023* (2013.01); *H05K 5/0017* (2013.01); *H04M 1/026* (2013.01); *H04R 2499/11* (2013.01); *H04R 2499/15* (2013.01)

(58) Field of Classification Search
CPC ......... H04R 1/023; H04R 1/02; H05K 5/0017
See application file for complete search history.

(56) References Cited

U.S. PATENT DOCUMENTS 11,540,046 B2 * 12/2022 Song ..................... H04R 1/025
2010/0202650 A1    8/2010 Park
(Continued)

FOREIGN PATENT DOCUMENTS

CN         207543153 U     6/2018
KR     10-2010-0090436 A   8/2010
(Continued)

OTHER PUBLICATIONS

Korean Office Action dated Mar. 21, 2023.
Notice of Patent Grant dated Oct. 4, 2023.

*Primary Examiner* — Olisa Anwah
(74) *Attorney, Agent, or Firm* — Cha & Reiter, LLC

(57) ABSTRACT

An electronic device comprises: a housing comprising a front plate, a rear plate facing in the opposite direction to the front plate, and a side member surrounding a space between the front plate and the rear plate; a display which is viewed from the outside through the front plate; a first opening formed between an edge of the front plate and the side member; a mid-plate which is arranged between the display and the rear plate and extends from the side member, overlaps the display when viewed from above the display, and includes a second opening adjacent to the first opening; a speaker which is located in a space adjacent to the second opening, between the mid-plate and the rear plate, and includes a diaphragm facing the display; a sound guide structure arranged between the mid-plate and the display, the (Continued)

sound guide structure comprising a grill portion, which is inserted into the first opening and includes a plurality of through holes, and a flange portion which extends from the grill portion to a space between the display and the mid-plate and forms a sound passage between the second opening and the grill portion together with the mid-plate; and a scaling member at least partially surrounding the periphery of the sound guide structure.

19 Claims, 9 Drawing Sheets

(56) References Cited

U.S. PATENT DOCUMENTS

| | | |
|---|---|---|
| 2013/0114840 A1 | 5/2013 | Shin |
| 2013/0170109 A1 | 7/2013 | Cohen et al. |
| 2014/0140558 A1* | 5/2014 | Kwong .................. H04R 3/007 381/345 |
| 2015/0043141 A1* | 2/2015 | Pegg ...................... H04M 1/026 361/679.55 |
| 2015/0340795 A1* | 11/2015 | Lee ........................ H04R 1/086 381/334 |
| 2017/0207516 A1* | 7/2017 | Koo ..................... H04M 1/0249 |
| 2018/0132020 A1 | 5/2018 | Seo et al. |
| 2019/0037293 A1 | 1/2019 | Kim |
| 2019/0343013 A1 | 11/2019 | Choi et al. |
| 2020/0186183 A1* | 6/2020 | Park ....................... H04M 1/026 |
| 2021/0067877 A1* | 3/2021 | Jeon ........................ H04S 1/007 |

FOREIGN PATENT DOCUMENTS

| | | |
|---|---|---|
| KR | 10-2013-0050045 A | 5/2013 |
| KR | 10-2017-0040082 A | 4/2017 |
| KR | 10-1779045 B1 | 9/2017 |
| KR | 10-2018-0052291 A | 5/2018 |
| KR | 10-2019-0012004 A | 2/2019 |

* cited by examiner

ELECTRONIC DEVICE INCLUDING SPEAKER

CROSS REFERENCE TO RELATED APPLICATIONS

This application is a National Phase Entry of PCT International Application No. PCT/KR2020/002232, which was filed on Feb. 17, 2020, and claims a priority to Korean Patent Application No. 10-2019-0018524, which was filed on Feb. 18, 2019, the contents of which are incorporated herein by reference.

TECHNICAL FIELD

Various embodiments of the present disclosure relate to an electronic device including a speaker.

BACKGROUND ART

An electronic device such as a smart phone, etc. can support various multimedia functions. For example, the electronic device can support a camera function and a video play function, etc. To support these multimedia functions, the electronic device can include a display and a speaker capable of outputting various contents. Also, the electronic device can include a sound hole communicating with the speaker capable of outputting a sound in a front region where the display is arranged.

Recently, as a user preferring a large screen is increased, researches and developments for increasing a size of the display in the electronic device are being continuously made. For instance, researches and developments capable of allowing the display to occupy most of the front region of the electronic device are being actively made.

DISCLOSURE OF INVENTION

Technical Problem

When a size of a display is increased in an electronic device, the arrangement of an internal structure of the electronic device and modules included in the electronic device can be changed. For example, a sound hole arranged in a front region of the electronic device where the display is arranged can be arranged a little more outside. Also, as the size of the display is increased, a BM region is decreased and accordingly to this a space for attaching a sealing member to the periphery of a deco grill covering the sound hole becomes insufficient, and it is difficult to shield by using the sealing member and thus a sound outputted from a speaker can be lost without being radiated to the sound hole.

Various embodiments of the present disclosure can provide an electronic device having a structure of guiding wherein a sound outputted from a speaker is radiated to a sound hole arranged in a front region of the electronic device.

Also, various embodiments of the present disclosure can provide an electronic device including a sealing member for shielding the periphery of a guide structure in order to decrease a sound loss.

Solution to Problem

An electronic device of various embodiments of the present disclosure can include a housing comprising a front plate, a rear plate facing in the opposite direction to the front plate, and a side member surrounding a space between the front plate and the rear plate, a display which is viewed from the outside through the front plate, a first opening formed between an edge of the front plate and the side member, a mid plate which is arranged between the display and the rear plate and extends from the side member, overlaps the display when viewed from above the display, and includes a second opening adjacent to the first opening, a speaker which is located in a space adjacent to the second opening, between the mid plate and the rear plate, and includes a diaphragm facing the display, a sound guide structure located between the mid plate and the display, the sound guide structure comprising a grill portion which is inserted into the first opening and includes a plurality of through holes, and a flange portion which extends from the grill portion to a space between the display and the mid plate and forms a sound conduit between the second opening and the grill portion together with the mid plate, and a sealing member at least partially surrounding the periphery of the sound guide structure.

Advantageous Effects of Invention

According to various embodiments of the present disclosure, in a structure in which a display occupies most of a front region of an electronic device, a sound hole to which a sound outputted from a speaker is radiated can be arranged in the front region of the electronic device.

Also, according to various embodiments of the present disclosure, the performance of sound radiation can be improved, by guiding and shielding wherein a sound outputted from a speaker can be radiated to a sound hole.

Besides this, various effects taken directly or indirectly through the present document can be offered.

BRIEF DESCRIPTION OF DRAWINGS

With regard to the description of the drawings, the same or similar reference numerals can be used for the same or similar components.

BEST MODE FOR CARRYING OUT THE INVENTION

Figure 1:
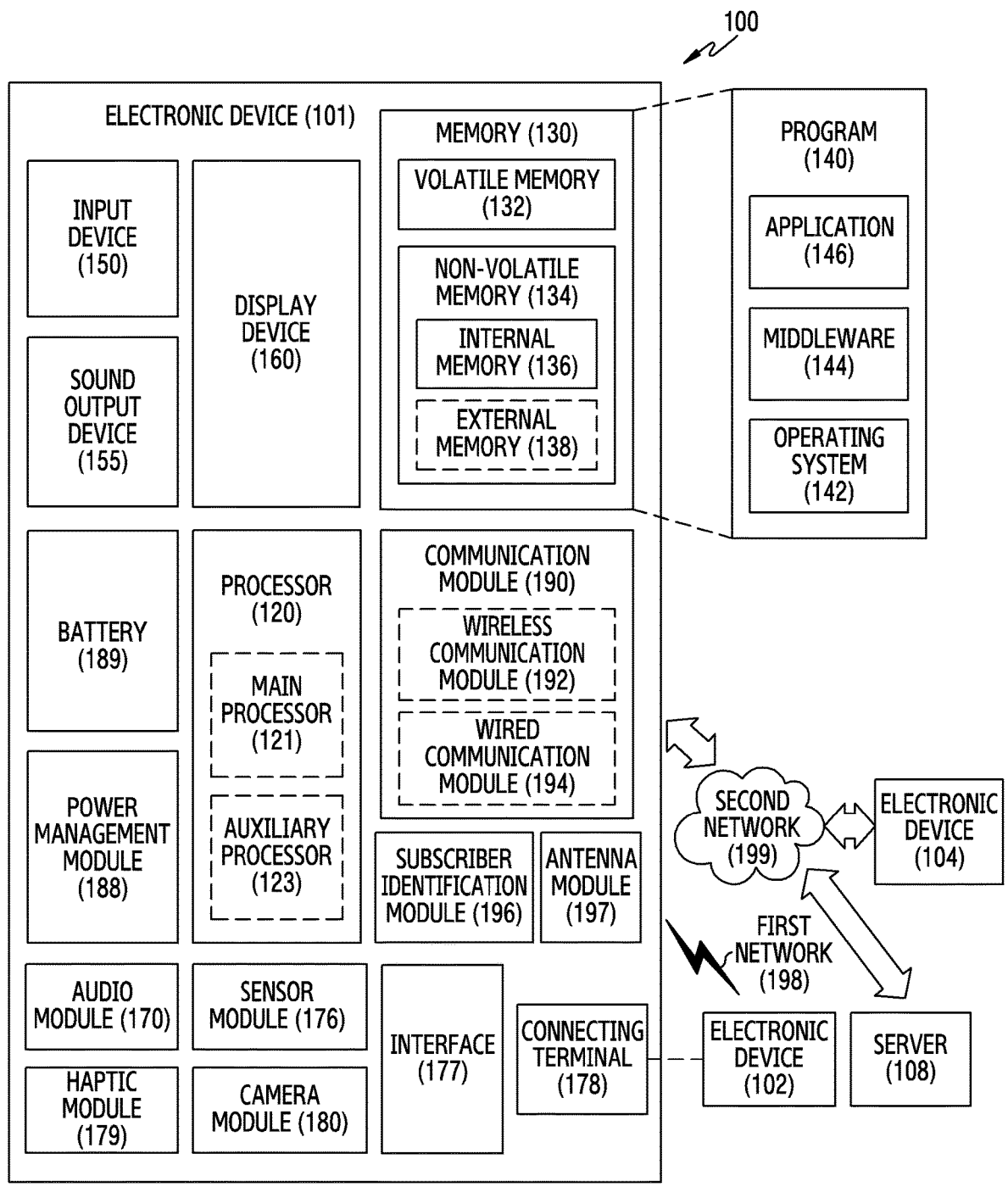
FIG. 1 is a block diagram of an electronic device within a network environment according to various embodiments.

Various embodiments of the present disclosure are described below with reference to the accompanying drawings. For description convenience's sake, the components illustrated in the drawings can be exaggerated or reduced in size, and the present disclosure is not necessarily limited by one illustrated.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
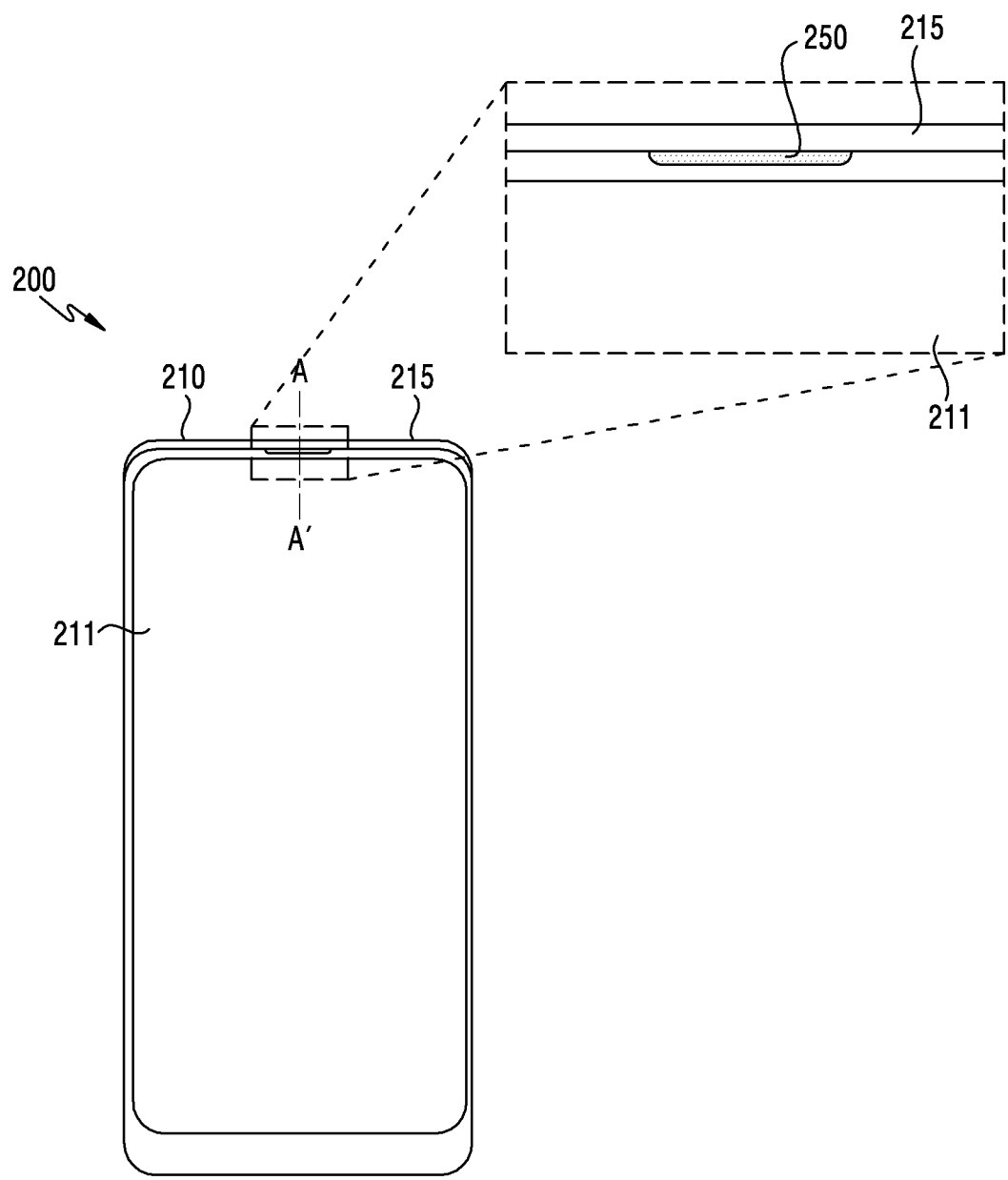
FIG. 2 is a diagram illustrating an electronic device according to an embodiment of the present disclosure.
Figure 3:
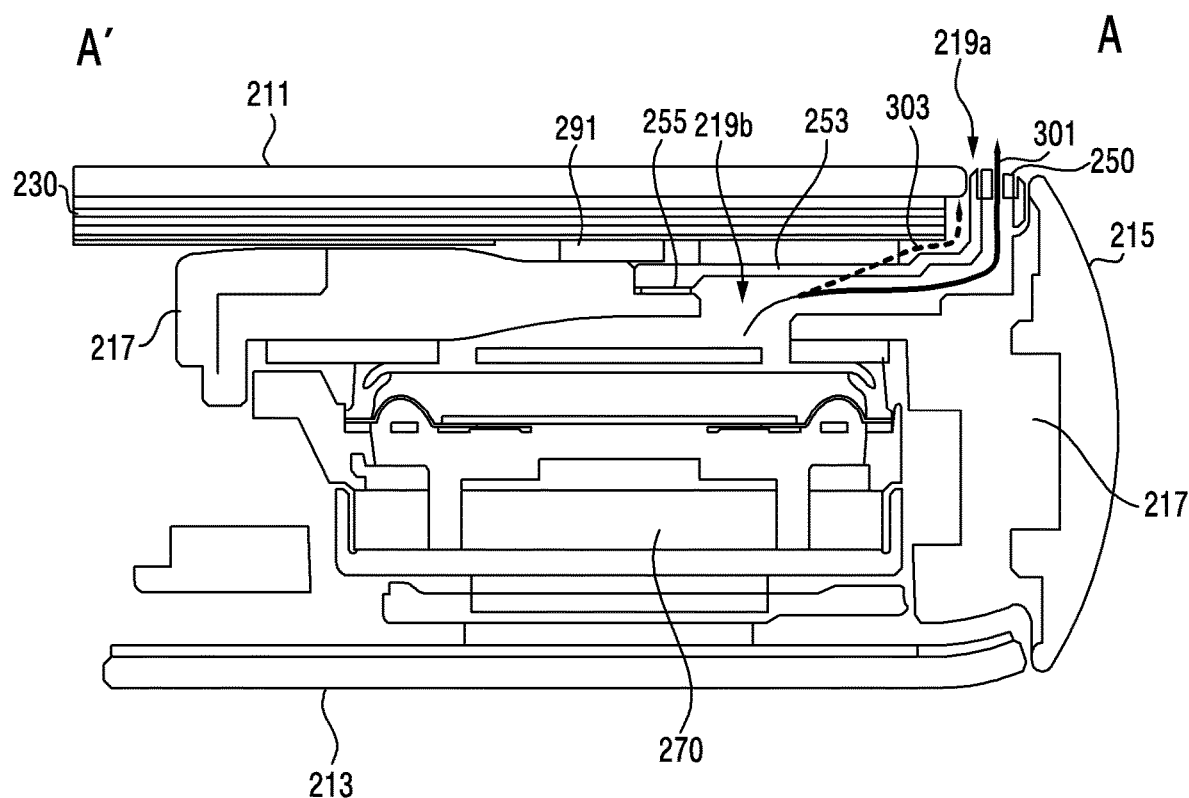
FIG. 3 is a cross section taken along line A-A' of FIG. 2 according to an embodiment of the present disclosure.

FIG. 2 is a diagram illustrating an electronic device according to an embodiment of the present disclosure, and FIG. 3 is a cross section taken along line A-A' of FIG. 2 according to an embodiment of the present disclosure.

Referring to FIG. 2 and FIG. 3, the electronic device 200 (e.g., the electronic device 101) can include a housing 210, a mid plate 217, a display 230, a deco grill 250, and a speaker 270 (or a receiver). The housing 210 can include a front plate 211, a rear plate 213 facing in the opposite direction to the front plate 211, and a side member 215 surrounding a space between the front plate 211 and the rear plate 213. In the present document, a side surface can mean a surface seen visually when viewing a thin surface of the electronic device 200, and a front surface is a region excepting the side surface and can mean a surface through which a screen outputted through the display 230 is exposed outside, and a rear surface can mean a surface facing the front surface. In some embodiment, a partial screen of the display 230 can be exposed outside through the rear surface and/or the side surface as well but, unlike the rear surface and/or the side surface, the front surface can be prepared wherein most of a region can output a screen of the display 230.

At least a partial region of the front plate 211 (or a window) can be prepared as a transparent material (e.g., a glass). A first opening 219a can be formed between an edge of the front plate 211 and the side member 215. The first opening 219a can perform a role of a sound hole for radiating a sound outputted from the speaker 270 to the outside. For instance, the first opening 219a can communicate with an output unit of the speaker 270.

According to an embodiment, the first opening 219a can be located in a front, center, and upper end of the electronic device 200. However, a location of the first opening 219a is not limited to this. According to various embodiments, the first opening 219a can be located in a front, left and upper end, or right and upper end of the electronic device 200 as well.

The mid plate 217 (or a bracket) can be arranged between the display 230 and the rear plate 213, and be extended from the side member 215. The mid plate 217 can fix and support the display 230. For instance, the display 230 can be safely seated in and be fixed to a front surface of the mid plate 217. According to an embodiment, the display 230 can be attached to the mid plate 217 through a first adhesive member 291. According to an embodiment, the mid plate 217 can be adhered to the front plate 211 through a second adhesive member (293 of FIG. 8 and FIG. 9).

The mid plate 217 can include a second opening 219b which overlaps the display 230 when viewed from above the display 230 and is adjacent to the first opening 219a. The second opening 219b can communicate with the first opening 219a.

The display 230 can be arranged between the front plate 211 and the mid plate 217. The display 230 can be viewed from the outside through the front plate 211. For instance, a screen outputted through the display 230 can be displayed outside through a transparent region of the front plate 211.

The display 230 can occupy most of a front surface of the electronic device 200. Accordingly to this, some of other components of the electronic device 200 can be arranged outside the electronic device 200. In an example, the deco grill 250 can be arranged in the outermost of a front and upper end of the electronic device 200.

The deco grill 250 can include a grill portion (251 of FIG. 4) inserted into the first opening 219a and including a plurality of through holes (251a of FIG. 4), and a flange portion 253 extending from the grill portion to between the display 230 and the mid plate 217 and forming a sound conduit between the second opening 219b and the grill portion together with the mid plate 217.

A sound can be radiated to the outside through the plurality of through holes formed in the grill portion of the deco grill 250, and the grill portion can cover the first opening 219a, thereby preventing foreign materials from being introduced into the first opening 219a. A shape and function of the deco grill 250 are described in detail through FIG. 4 to FIG. 7.

The speaker 270 can convert an electric signal into a sound (i.e., a sound signal), and output the sound through an output unit (e.g., a diaphragm). The speaker 270 can include the diaphragm which is located in a space adjacent to the second opening 219b, between the mid plate 217 and the rear plate 213, and faces the display 230. Accordingly to this, the sound outputted through the diaphragm can pass the second opening 219b and be radiated outside through the first opening 219a communicating with the second opening 219b.

Figure 4:
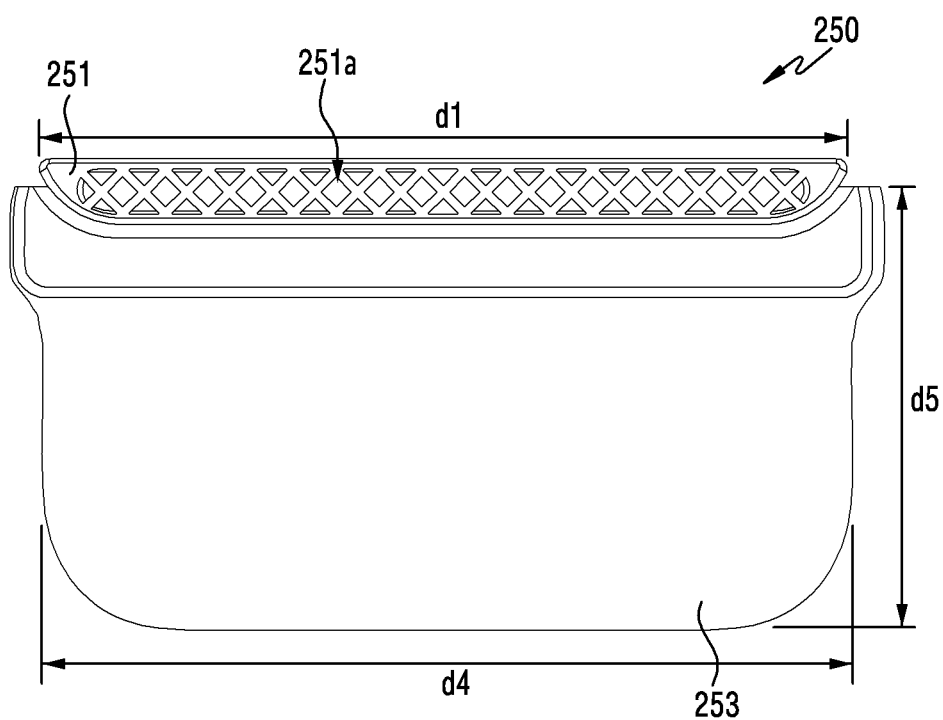
FIG. 4 is a diagram illustrating a deco grill according to an embodiment of the present disclosure.
Figure 5:
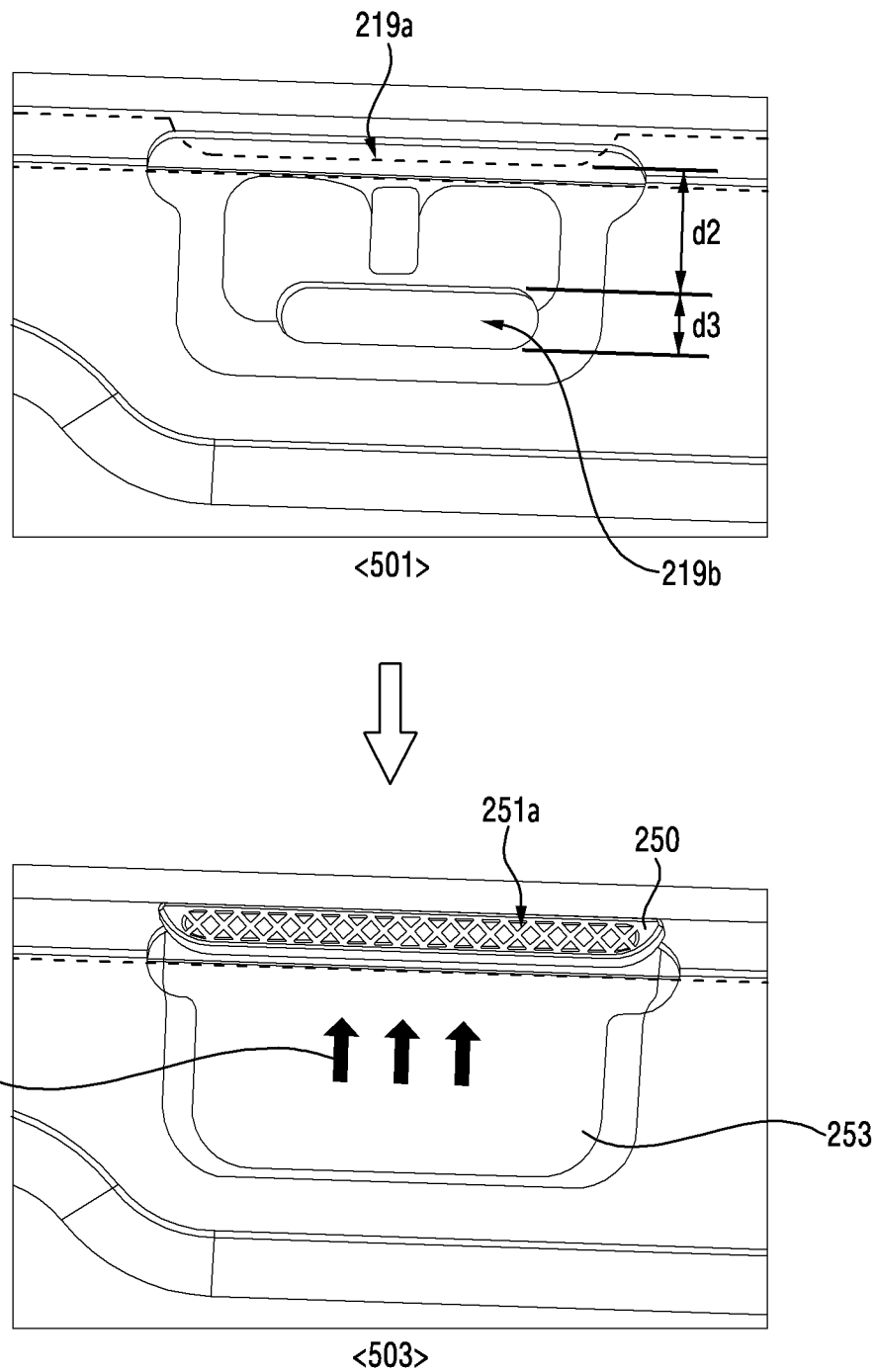
FIG. 5 is a diagram for explaining a sound guide structure through a deco grill according to an embodiment of the present disclosure.

FIG. 4 is a diagram illustrating a deco grill according to an embodiment of the present disclosure, and FIG. 5 is a diagram for explaining a sound guide structure through the deco grill according to an embodiment of the present disclosure.

Referring to FIG. 4 and FIG. 5, the deco grill 250 can include a grill portion 251 and a flange portion 253. The grill portion 251 can include a plurality of through holes 251a formed by going through a front surface to a rear surface. According to an embodiment, the front surface (and the rear surface) of the grill portion 251 can have a size corresponding to a size of the first opening 219a formed between an edge of the front plate 211 and the side member 215. Also, the grill portion 251 can have a predetermined height. For example, a side surface of the grill portion 251 can have a height length of a predetermined size. Accordingly to this, when the grill portion 251 is inserted into the first opening 219a, the side surface of the grill portion 251 can be arranged along an inner side surface of the side member 215, between the front plate 211 and the side member 215. Also, the front surface of the grill portion 251 can cover the first opening 219a, and a sound outputted from the speaker 270 can be radiated outside through the plurality of through holes 251a formed by going through the front surface of the grill portion 251.

The flange portion 253 can extend in one direction from the grill portion 251. According to an embodiment, the flange portion 253 can extend from the grill portion 251 to between the display 240 and the mid plate 217. At this time, the flange portion 253 can have a shape of covering the second opening 219b formed in the mid plate 217, when viewed from above the display 230. For example, in response to the sound outputted from the speaker 270 being radiated to the second opening 219b, it can move (301) to the grill portion 251 along the flange portion 253, and resultantly pass the first opening 219a covered by the grill portion 251 and be radiated outside through the through holes 251a of the grill portion 251. That is, the flange portion 253 can form a sound conduit between the second opening 219b and the grill portion 251, together with the mid plate 217. By forming the sound conduit, the flange portion 253 can prevent the sound outputted from the speaker 270 from being leaked to a gap between the deco grill 250 and the front plate 211.

According to an embodiment, the flange portion 253 can have a width length (d4) corresponding to a width length (d1) of the rear surface (and the front surface) of the grill portion 251, and can have a height length (d5) (i.e., a length extending from the grill portion 251) corresponding to a size adding up a distance (d2) between the first opening 219a and the second opening 219b and a height length (d3) of the second opening 219b. In some embodiment, the height length (d5) of the flange portion 253 can be longer by a predetermined size than the size adding up the distance (d2) between the first opening 219a and the second opening 219b and the height length (d3) of the second opening 219b. The width length (d1 or d4) can indicate a length of a left right direction (or a horizontal direction) of the electronic device 200, i.e., a direction substantially in parallel with a side (or an up down side) of a short length of the front plate 211 when viewed from above the front plate 211. And, the height length (d3 or d5) can indicate a length of an up down direction (or a vertical direction) of the electronic device 200, i.e., a direction substantially in parallel with a side (or a left right side) of a long length of the front plate 211 when viewed from above the front plate 211.

According to an embodiment, the flange portion 253 can overlap at least a portion of the speaker 270, when viewed from above the front plate 211. In another embodiment, the flange portion 253 can overlap the whole of the speaker 270, when viewed from above the front plate 211.

A first state 501 of FIG. 5 is a state in which the deco grill 250 is not combined, and a second state 503 of FIG. 5 indicates a state in which the deco grill 250 is combined. As in the second state 503, the deco grill 250 can have a shape in which the flange portion 253 extending in one direction from the grill portion 251 covers the second opening 219b when viewed from above the display 230, thereby forming a sound conduit wherein a sound radiated through the second opening 219b moves (301) to the grill portion 251 along the flange portion 253.

According to an embodiment, at least a partial region of the deco grill 250 can include a magnetic shield member. In an example, when viewed from above the front plate 211, the at least partial region of the deco grill 250 overlapping the speaker 270 can include the magnetic shield member. In this case, the magnetic shield member can shield magnetism provided in the speaker 270 and prevent an erroneous operation of an electromagnetic inductive panel (e.g., a digitizer) and/or a display panel (i.e., the display 230) arranged above the speaker 270. According to an embodiment, the magnetic shield member can include at least one of a ferromagnetic body (e.g., steel plate cold commercial (SPCC)) or a metallic material (e.g., a steel). However, materials of the deco grill 250 are not limited to this.

Figure 6:
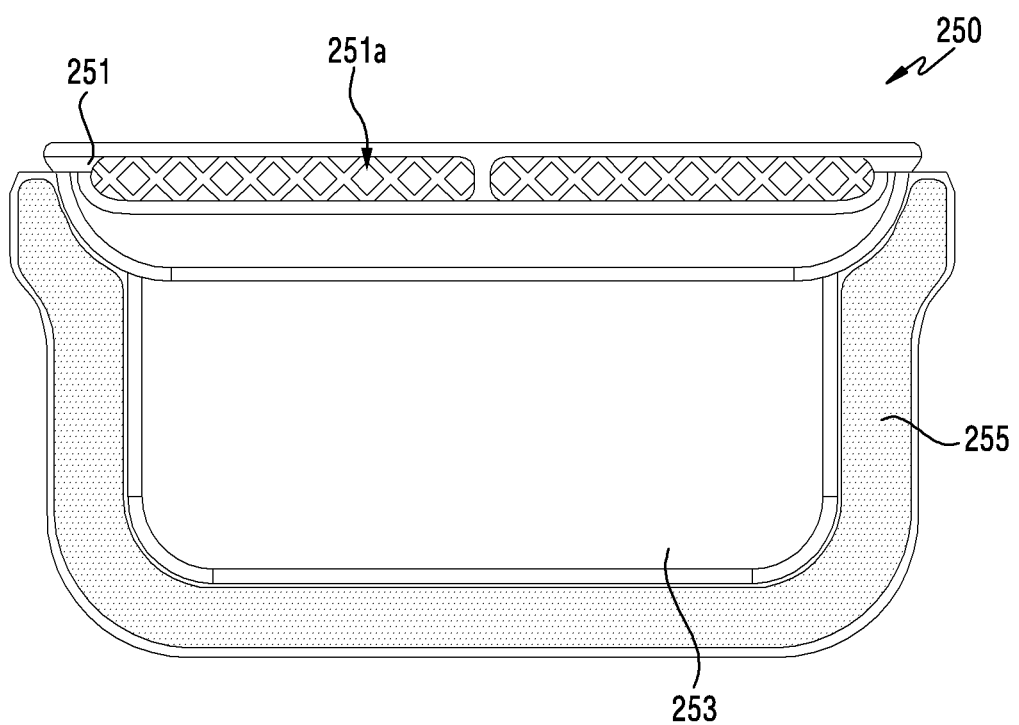
FIG. 6 is a diagram illustrating a deco grill to which a sealing member is attached according to an embodiment of the present disclosure.
Figure 7:
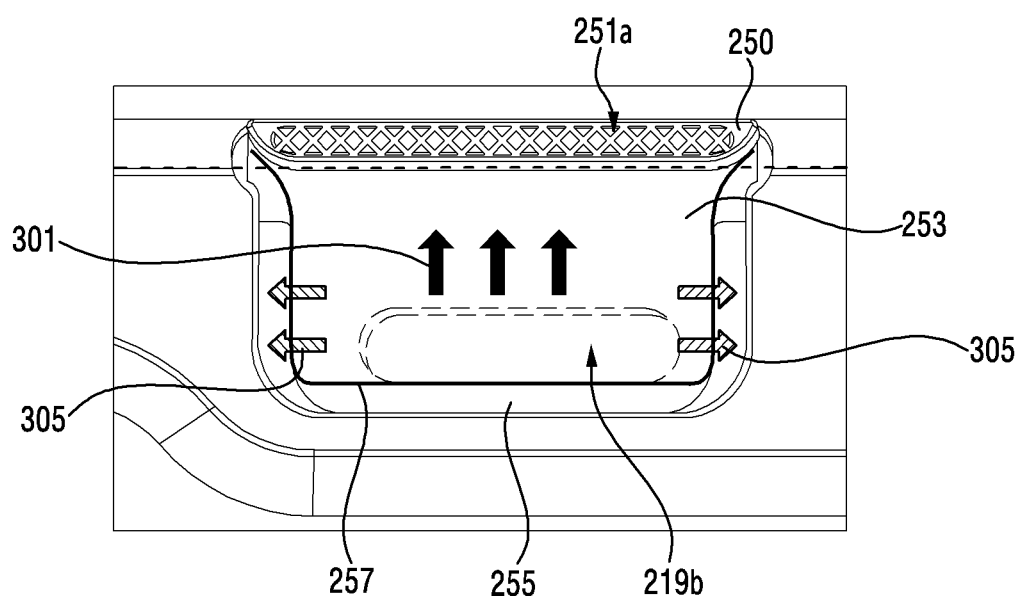
FIG. 7 is a diagram for explaining sound loss prevention through a sealing member attached to a deco grill according to an embodiment of the present disclosure.

FIG. 6 is a diagram illustrating a deco grill to which a sealing member is attached according to an embodiment of the present disclosure, and FIG. 7 is a diagram for explaining sound loss prevention through the sealing member attached to the deco grill according to an embodiment of the present disclosure.

Referring to FIG. 6 and FIG. 7, the deco grill 250 can include the sealing member 255 (or a sealing tape). The sealing member 255 can surround at least a portion of the periphery of the deco grill 250. For instance, the sealing member 255 can surround a portion of a side surface of the grill portion 251 and a portion or whole of an edge of the flange portion 253.

The sealing member 255 can, as illustrated in FIG. 3, attach the deco grill 250 to the mid plate 217. In response to the deco grill 250 being attached to the mid plate 217 through the sealing member 255, the sealing member 255 can perform a shield function of preventing a sound loss. For instance, in response to the deco grill 250 being attached to the mid plate 217 through the sealing member 255, as in FIG. 7, a sound sealing line 257 can be formed along an attachment surface of the sealing member 255. That is, when the sound outputted from the speaker 270 moves along the flange portion 253 after being radiated to the second opening 219b, the sound moving (305) to both sides without moving (301) to the grill portion 251 is cut off by the sound sealing line 257 and may not be lost outside. Also, the sound cut off by the sound sealing line 257 can convert in direction and resultantly move (301) to the grill portion 251.

According to an embodiment, the sealing member 255 can include at least one of poron, rubber, or silicon.

Figure 8:
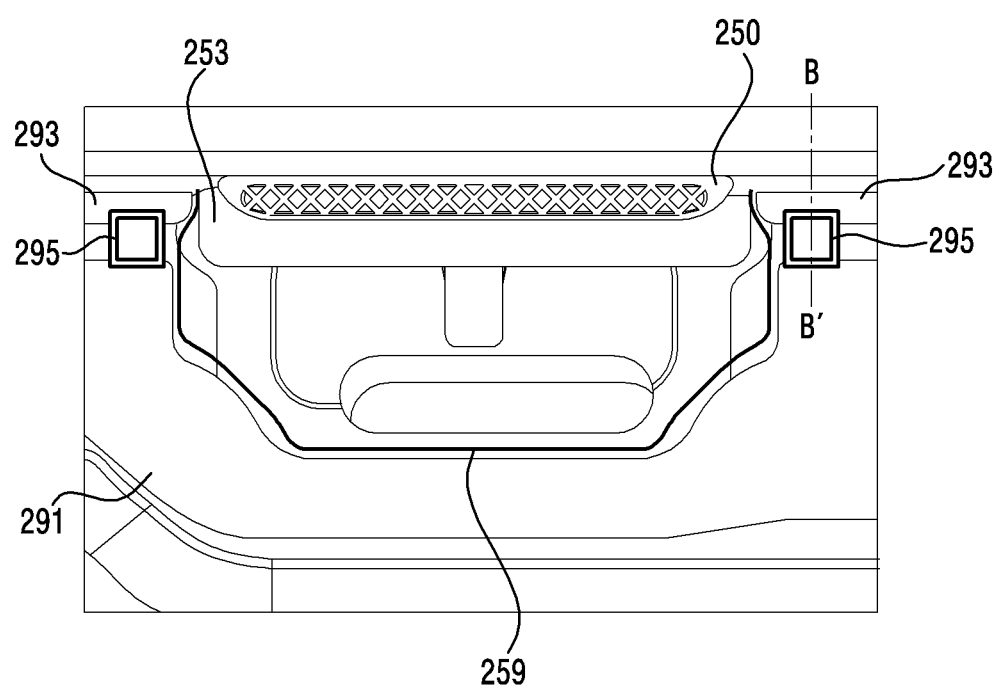
FIG. 8 is a diagram for explaining sound loss prevention which uses a sealing sub material according to an embodiment of the present disclosure.
Figure 9:
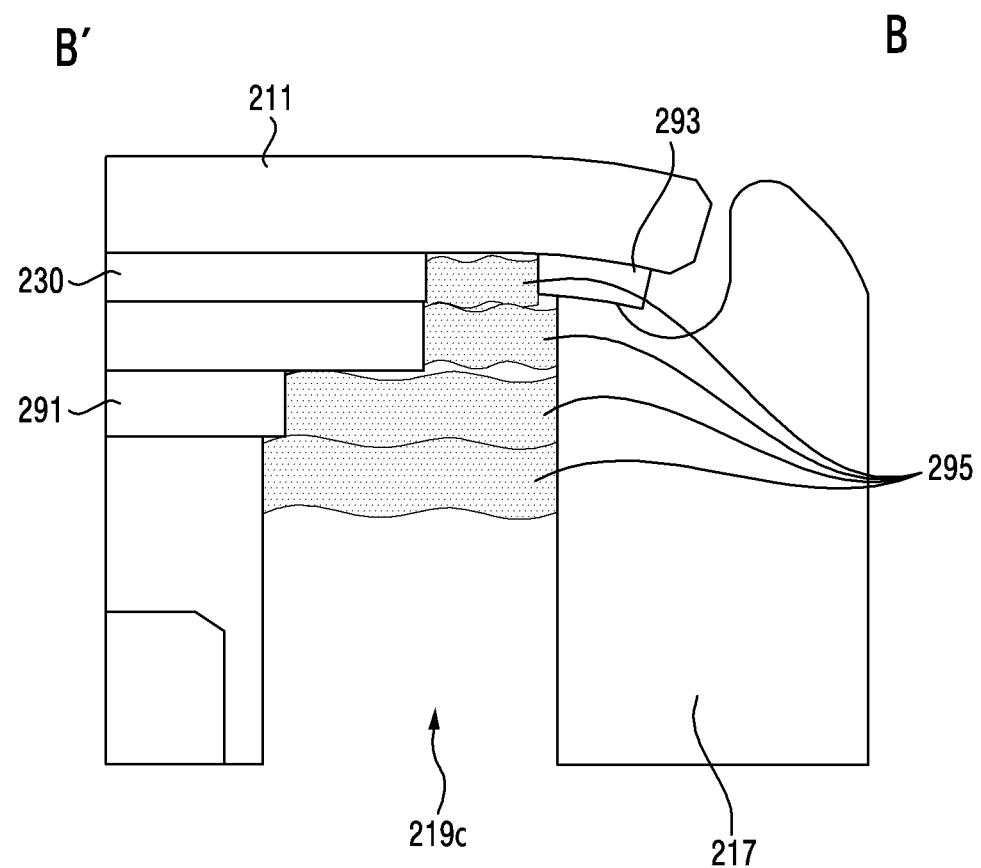
FIG. 9 is a cross section taken along line B-B' of FIG. 8 according to an embodiment of the present disclosure.

FIG. 8 is a diagram for explaining sound loss prevention which uses a sealing sub material according to an embodiment of the present disclosure, and FIG. 9 is a cross section taken along line B-B' of FIG. 8 according to an embodiment of the present disclosure.

Referring to FIG. 8 and FIG. 9, the display 230 can be attached to the mid plate 217 through the first adhesive member 291. Also, the mid plate 217 can be attached to the front plate 211 through the second adhesive member 293.

An adhesive surface of the first adhesive member 291 and an adhesive surface of the second adhesive member 293 can be spaced apart from each other with steps. For instance, a space 219c can be formed between the first adhesive member 291 and the second adhesive member 293. In response to the flange portion 253 of the deco grill 250 not enough extending from the grill portion 251 (in response to the flange portion 253 failing to cover the second opening 219b formed in the mid plate 217 when viewed from above the display 230), the sound outputted from speaker 270 can be lost through the space 219c.

To prevent this, at least one sealing sub material 295 can be arranged in the space 219c. For example, at least one sealing sub material 295 can be inserted into the space 219c and be fitted between the first adhesive member 291 and the second adhesive member 923, to prevent a sound loss. Accordingly to this, the sound sealing line 259 can be formed along the adhesive surface of the first adhesive member 291, the adhesive surface of the second adhesive member 293, and an insertion surface (or an adhesive surface) of the at least one sealing sub material 295. That is, when the sound outputted from the speaker 270 moves to the grill portion 251 after being radiated to the second opening 219b, the sound moving in a different direction without moving to the grill portion 251 is cut off by the sound sealing line 259 and may not be lost outside. Also, the sound cut off by the sound sealing line 259 can convert in direction and resultantly move to the grill portion 251.

According to an embodiment, a plurality of the sealing sub materials 295 can construct many layers. For instance, the plurality of the sealing sub materials 295 can be arranged in several folds in the space 219c.

According to an embodiment, the sealing sub material 295 can include the same or similar material with the sealing member 255. For instance, the sealing sub material 295 can include at least one of poron, rubber, or silicon.

In FIG. 8 and FIG. 9, a description has been made for a structure of preventing a sound loss through the sealing sub material 295 in a state in which the flange portion 253 of the deco grill 250 does not enough extend from the grill portion 251, that is, in a state in which the flange portion 253 fails to cover the second opening 219b formed in the mid plate 217 when viewed from above the display 230, but an embodiment is not limited to this. According to various embodiments, even in a state in which the flange portion 253 enough extends from the grill portion 251 as in FIG. 3 to FIG. 7, that is, in a state in which the flange portion 253 covers the second opening 219b when viewed from above the display 230, the sealing sub material 295 can be arranged to enhance an effect of sound loss prevention.

As described above, according to various embodiments, an electronic device (e.g., the electronic device 101 or the electronic device 200) can include a housing (e.g., the housing 210) including a front plate (e.g., the front plate 211), a rear plate (e.g., the rear plate 213) facing in the opposite direction to the front plate, and a side member (e.g., the side member 215) surrounding a space between the front plate and the rear plate, a display (e.g., the display device 160 or the display 230) which is viewed from the outside through the front plate, a first opening (e.g., the first opening 219a) formed between an edge of the front plate and the side member, a mid plate (e.g., the mid plate 217) which is arranged between the display and the rear plate and extends from the side member, overlaps the display when viewed from above the display, and includes a second opening (e.g., the second opening 219b) adjacent to the first opening, a speaker (e.g., the sound output device 155 or the speaker 270) which is located in a space adjacent to the second opening, between the mid plate and the rear plate, and includes a diaphragm facing the display, a sound guide structure (e.g., the deco grill 250) located between the mid plate and the display, the sound guide structure including a grill portion (e.g., the grill portion 251) which is inserted into the first opening and includes a plurality of through holes (e.g., the through hole 251a), and a flange portion (e.g., the flange portion 253) which extends from the grill portion to a space between the display and the mid plate and forms a sound conduit between the second opening and the grill portion together with the mid plate, and a sealing member (e.g., the sealing member 255) at least partially surrounding the periphery of the sound guide structure.

According to various embodiments, at least a partial region of the sound guide structure can include at least one of a ferromagnetic body or a metallic material, and the flange portion can overlap the whole speaker when viewed from above the front plate.

According to various embodiments, the sealing member can include at least one of poron, rubber, or silicon.

According to various embodiments, the flange portion can have a shape of covering the second opening when viewed from above the display.

According to various embodiments, a length in which the flange portion extends from the grill portion can correspond to a size adding up a distance between the first opening and the second opening and a height length of the second opening.

According to various embodiments, the sealing member can attach the sound guide structure to the mid plate.

According to various embodiments, the electronic device can further include a first adhesive member (e.g., the first adhesive member 291) attaching the display to the mid plate, a second adhesive member (e.g., the second adhesive member 293) attaching the front plate to the mid plate, and at least one sealing sub material (e.g., the sealing sub material 295) fitted between the first adhesive member and the second adhesive member.

According to various embodiments, the at least one sealing sub material can include a plurality of sealing sub materials, and the plurality of sealing sub materials can be arranged in several folds between the first adhesive member and the second adhesive member.

As described above, according to various embodiments, an electronic device (e.g., the electronic device 101 or the electronic device 200) can include a housing (e.g., the housing 210) including a front plate (e.g., the front plate 211), a rear plate (e.g., the rear plate 213) facing in the opposite direction to the front plate, and a side member (e.g., the side member 215) surrounding a space between the front plate and the rear plate, a display (e.g., the display device 160 or the display 230) which is viewed from the outside through the front plate, a first opening (e.g., the first opening 219a) formed between an edge of the front plate and the side member, a mid plate (e.g., the mid plate 217) which is arranged between the display and the rear plate and extends from the side member, overlaps the display when viewed from above the display, and includes a second opening (e.g., the second opening 219b) adjacent to the first opening, a speaker (e.g., the sound output device 155 or the speaker 270) which is located in a space adjacent to the second opening, between the mid plate and the rear plate, and includes a diaphragm facing the display, a deco grill (e.g., the deco grill 250) which is inserted into the first opening and includes a plurality of through holes (e.g., the through hole 251a), a first adhesive member (e.g., the first adhesive member 291) attaching the display to the mid plate, a second adhesive member (e.g., the second adhesive member 293) attaching the front plate to the mid plate, and at least one sealing member (e.g., the sealing sub material 295) fitted between the first adhesive member and the second adhesive member.

According to various embodiments, the at least one sealing member can include a plurality of sealing members, and the plurality of sealing members can be arranged in several folds between the first adhesive member and the second adhesive member.

As described above, according to various embodiments, an electronic device (e.g., the electronic device 101 or the electronic device 200) can include a housing (e.g., the housing 210) including a front plate (e.g., the front plate 211), a rear plate (e.g., the rear plate 213) facing in the opposite direction to the front plate, and a side member (e.g., the side member 215) surrounding a space between the front plate and the rear plate, a display (e.g., the display device 160 or the display 230) which is viewed from the outside through the front plate, a first opening (e.g., the first opening 219a) formed between an edge of the front plate and the side member, a mid plate (e.g., the mid plate 217) which is arranged between the display and the rear plate and extends from the side member, overlaps the display when viewed from above the display, and includes a second opening (e.g., the second opening 219b) adjacent to the first opening, a speaker (e.g., the sound output device 155 or the speaker 270) which is located in a space adjacent to the second opening, between the mid plate and the rear plate, and includes a diaphragm facing the display, and a deco grill (e.g., the deco grill 250) which is inserted into the first opening and is located between the mid plate and the display, the deco grill including a grill portion (e.g., the grill portion 251) which includes a plurality of through holes (e.g., the through hole 251a) and covers the first opening, and a flange portion (e.g., the flange portion 253) which extends from the grill portion to between the display and the mid plate and forms a sound conduit between the second opening and the grill portion together with the mid plate.

According to various embodiments, the electronic device can further include a sealing member (e.g., the sealing member 255) at least partially surrounding the periphery of the deco grill.

According to various embodiments, the sealing member can surround a portion of a side surface of the grill portion and at least a portion of an edge of the flange, and attach the deco grill to the mid plate.

According to various embodiments, at least a partial region of the deco grill can include at least one of a ferromagnetic body or a metallic material, and the flange portion can overlap the whole speaker when viewed from above the front plate.

According to various embodiments, the sealing member can include at least one of poron, rubber, or silicon.

According to various embodiments, the flange portion can have a shape of covering the second opening when viewed from above the display.

According to various embodiments, a length in which the flange portion extends from the grill portion can correspond to a size adding up a distance between the first opening and the second opening and a height length of the second opening.

According to various embodiments, the electronic device can further include a first adhesive member (e.g., the first adhesive member 291) attaching the display to the mid plate, a second adhesive member (e.g., the second adhesive member 293) attaching the front plate to the mid plate, and at least one sealing sub material (e.g., the sealing sub material 295) fitted between the first adhesive member and the second adhesive member.

According to various embodiments, the at least one sealing sub material can include a plurality of sealing sub materials, and the plurality of sealing sub materials can be arranged in several folds between the first adhesive member and the second adhesive member.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a housing comprising a front plate, a rear plate facing in the opposite direction to the front plate, and a side member surrounding a space between the front plate and the rear plate;
   a display which is viewed from the outside through the front plate;
   a first opening formed between an edge of the front plate and the side member;
   a mid plate which is arranged between the display and the rear plate and extends from the side member, overlaps the display when viewed from above the display, and includes a second opening adjacent to the first opening;
   a speaker which is located in a space adjacent to the second opening, between the mid plate and the rear plate, and includes a diaphragm facing the display;
   a sound guide structure located between the mid plate and the display, the sound guide structure comprising a grill portion which is inserted into the first opening and includes a plurality of through holes, and a flange portion which extends from the grill portion to a space between the display and the mid plate and forms a sound conduit between the second opening and the grill portion together with the mid plate; and a sealing member at least partially surrounding the periphery of the sound guide structure.

2. The electronic device of claim 1, wherein at least a partial region of the sound guide structure comprises at least one of a ferromagnetic body or a metallic material, and
the flange portion overlaps the whole speaker when viewed from above the front plate.

3. The electronic device of claim 1, wherein the sealing member comprises at least one of poron, rubber, or silicon.

4. The electronic device of claim 1, wherein the flange portion has a shape of covering the second opening when viewed from above the display.

5. The electronic device of claim 1, wherein a length in which the flange portion extends from the grill portion corresponds to a size adding up a distance between the first opening and the second opening and a height length of the second opening.

6. The electronic device of claim 1, wherein the sealing member attaches the sound guide structure to the mid plate.

7. The electronic device of claim 1, further comprising:
a first adhesive member attaching the display to the mid plate;
a second adhesive member attaching the front plate to the mid plate; and
at least one sealing sub material fitted between the first adhesive member and the second adhesive member.

8. The electronic device of claim 7, wherein the at least one sealing sub material comprises a plurality of sealing sub materials, and
the plurality of sealing sub materials are arranged in several folds between the first adhesive member and the second adhesive member.

9. An electronic device comprising:
a housing comprising a front plate, a rear plate facing in the opposite direction to the front plate, and a side member surrounding a space between the front plate and the rear plate;
a display which is viewed from the outside through the front plate;
a first opening formed between an edge of the front plate and the side member;
a mid plate which is arranged between the display and the rear plate and extends from the side member, overlaps the display when viewed from above the display, and comprises a second opening adjacent to the first opening;
a speaker which is located in a space adjacent to the second opening, between the mid plate and the rear plate, and comprises a diaphragm facing the display;
a deco grill which is inserted into the first opening and comprises a plurality of through holes;
a first adhesive member attaching the display to the mid plate;
a second adhesive member attaching the front plate to the mid plate; and
at least one sealing member fitted between the first adhesive member and the second adhesive member.

10. The electronic device of claim 9, wherein the at least one sealing member comprises a plurality of sealing members, and
the plurality of sealing members are arranged in several folds between the first adhesive member and the second adhesive member.

11. An electronic device comprising:
a housing comprising a front plate, a rear plate facing in the opposite direction to the front plate, and a side member surrounding a space between the front plate and the rear plate;
a display which is viewed from the outside through the front plate;
a first opening formed between an edge of the front plate and the side member;
a mid plate which is arranged between the display and the rear plate and extends from the side member, overlaps the display when viewed from above the display, and comprises a second opening adjacent to the first opening;
a speaker which is located in a space adjacent to the second opening, between the mid plate and the rear plate, and comprises a diaphragm facing the display; and
a deco grill which is inserted into the first opening and is located between the mid plate and the display, the deco grill comprising a grill portion which comprises a plurality of through holes and covers the first opening, and a flange portion which extends from the grill portion to between the display and the mid plate and forms a sound conduit between the second opening and the grill portion together with the mid plate.

12. The electronic device of claim 11, wherein at least a partial region of the deco grill comprises at least one of a ferromagnetic body or a metallic material, and
the flange portion overlaps the whole speaker when viewed from above the front plate.

13. The electronic device of claim 11, wherein the flange portion has a shape of covering the second opening when viewed from above the display.

14. The electronic device of claim 11, wherein a length in which the flange portion extends from the grill portion corresponds to a size adding up a distance between the first opening and the second opening and a height length of the second opening.

15. The electronic device of claim 11, further comprising:
a first adhesive member attaching the display to the mid plate;
a second adhesive member attaching the front plate to the mid plate; and
at least one sealing sub material fitted between the first adhesive member and the second adhesive member.

16. The electronic device of claim 15, wherein the at least one sealing sub material comprises a plurality of sealing sub materials, and
wherein the plurality of sealing sub materials are arranged in several folds between the first adhesive member and the second adhesive member.

17. The electronic device of claim 11, further comprises a sealing member at least partially surrounding the periphery of the deco grill.

18. The electronic device of claim 17, wherein the sealing member surrounds a porting of a side surface of the grill portion and at least a portion of an edge of the flange portion, and attaches the deco grill to the mid plate.

19. The electronic device of claim 11, wherein the sealing member comprises at least one of poron, rubber, or silicon.

* * * * *